(12) United States Patent
Mertens (10) Patent No.: US 12,158,756 B1
(45) Date of Patent: Dec. 3, 2024

(54) REMOTE OPERATION QUEUEING FOR AUTONOMOUS VEHICLES

(71) Applicant: Zoox, Inc., Foster City, CA (US)

(72) Inventor: Alexander Jacques Maria Mertens, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 369 days.

(21) Appl. No.: 17/525,743

(22) Filed: Nov. 12, 2021

(51) Int. Cl.
*G05D 1/00* (2024.01)
*G06Q 10/0631* (2023.01)

(52) U.S. Cl.
CPC ......... *G05D 1/0027* (2013.01); *G05D 1/0293* (2013.01); *G06Q 10/063112* (2013.01); *G06Q 10/063114* (2013.01); *G06Q 10/06315* (2013.01)

(58) Field of Classification Search
CPC ............... G05D 1/0027; G05D 1/0293; G05D 2201/0213; G06Q 10/063112; G06Q 10/063114; G06Q 10/06315
See application file for complete search history.

(56) References Cited

U.S. PATENT DOCUMENTS

| | | | |
|---|---|---|---|
| 2018/0124213 A1* | 5/2018 | Wood | H04L 47/50 |
| 2020/0272949 A1* | 8/2020 | Chen | G06Q 10/063112 |
| 2022/0217237 A1* | 7/2022 | Sasaki | G06Q 50/26 |
| 2023/0075193 A1* | 3/2023 | Bush | G05D 1/0011 |
| 2023/0092975 A1* | 3/2023 | Kalouche | G05B 19/427 |
| | | | 700/259 |

\* cited by examiner

*Primary Examiner* — Anshul Sood
*Assistant Examiner* — Matthew Ho
(74) *Attorney, Agent, or Firm* — Lee & Hayes, P.C.

(57) ABSTRACT

An autonomous vehicle fleet may include multiple autonomous vehicles. The autonomous vehicles of the fleet may be configured to request remote operator input in response to encountering a situation internally or in the environment that the vehicle is unable to resolve. The autonomous vehicle of the fleet requests remote operator input through a fleet queue system that prioritizes the input requests and matches requests to available remote operators for processing and resolving the situations.

20 Claims, 5 Drawing Sheets

REMOTE OPERATION QUEUEING FOR AUTONOMOUS VEHICLES

BACKGROUND

Semi- and fully-autonomous vehicles introduce a new set of technical challenges relative to driver-operated vehicles. For example, an autonomous vehicle may encounter a scenario that has not previously been encountered or that is complex enough that the autonomous vehicle cannot determine with a sufficient level of certainty how to traverse the scenario. In such situations, inputs from remote operators may assist the autonomous vehicle to traverse the scenario.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

This application relates to techniques for rapidly and accurately providing guidance to a fleet of driverless vehicles that have requested assistance traversing an environment. The techniques discussed herein may facilitate prioritizing and generating a queue of requests for assistance, assigning remote operators remote operator to service a request, and rapidly apprising the assigned remote operator of a situation at a respective driverless vehicle to obtain real-time guidance for the driverless vehicle that does not cause undue or noticeable delay at the driverless vehicle.

In some examples, a driverless vehicle of a fleet of driverless vehicles ("autonomous vehicles") may encounter an event that it is unable to confidently traverse, such as an event that is unpredictable in nature, poses safety concerns, or requires responses to spontaneous visual cues or direction from, for example, police officers or construction workers. In some examples, the autonomous vehicle may be unable to plan a path to traverse an obstacle and/or may determine that a confidence level associated with one or more maneuvers (e.g., a planned trajectory or path of the vehicle) and/or events (e.g., detection or classification of a particular object, prediction of a behavior of an object, etc.) is insufficient (e.g., is below a threshold confidence level) to proceed autonomously. In such cases, the autonomous vehicle may send a request to a remote operations service to obtain guidance to proceed.

In some examples, a plurality of autonomous vehicles may convey requests for remote operator input at or around the same time. The techniques described herein may be designed to receive notifications from one or more autonomous vehicles within a fleet and prioritize those requests for processing by remote operators from a queue. The requests may be ordered within the queue and conveyed to remote operators for processing. The remote operator requests may be prioritized based on safety considerations, such as a vehicle operating speed (e.g., highway operation versus city street operation), occupancy status of the vehicle (occupied or vacant, number of occupants, etc.), length of ride, traffic volume, or other factors. In some examples, the requests and available remote operators may be matched by filtering available remote operators based on details of the request such as a vehicle type, environment location, passenger status (e.g., whether passengers are in the vehicle or not), and other such information.

The techniques described herein quickly bring a remote operator to full awareness of a situation at an autonomous vehicle so that the remote operator may provide guidance to the autonomous vehicle with minimum delay. Additionally, by filtering available remote operators based on experience and familiarity with a vehicle type or environment, the remote operators may be able to quickly understand the situation and respond accordingly. Delay in relaying this guidance to an autonomous vehicle or processing a request from a queue may have consequences ranging from the more trivial (e.g., annoyance of other drivers at a delay of the autonomous vehicle or passenger annoyance) to the severe (e.g., a threat to passenger safety). The techniques discussed herein prioritize requests with more severe consequences for processing and bring the remote operator to full enough understanding of the situation at the autonomous vehicle to quickly formulate guidance that may be relayed to the autonomous vehicle. In some examples, the remote operations requests may include time sensitive response windows wherein if a remote operator does not respond to a request within a period of time (e.g., a few seconds) then the request is returned to the queue and re-prioritized within the queue. Returned requests may receive additional priority within the queue due to the delay in processing the request.

The techniques discussed herein may include obtaining a request for assistance from an autonomous vehicle, prioritizing and queueing the request, and providing information regarding the request to a remote operator via a user interface to quickly and accurately apprise the remote operator of the situation. In some examples, the information may include sensor data obtained by the autonomous vehicle (and/or representations thereof-such as bounding boxes, classifications, or the like) and/or operation state data (e.g., information that the autonomous vehicle has collected, amalgamated, and/or created, as discussed in more detail below).

In some examples, the guidance may include a transmission of processor-executable instructions via a network interface from a remote operations device to the autonomous vehicle. In some examples, the guidance may include additional input, such as to select a path or location among multiple options or otherwise provide additional input to aid the vehicle system in generating a route. In some examples, the guidance may include direct instructions that configure the autonomous vehicle to perform an operation, to collaborate with the autonomous vehicle to determine an operation to perform, and/or to confirm a potential operation that the autonomous vehicle has determined.

The techniques discussed herein may also include dissemination of requests for assistance from multiple autonomous vehicles between one or more remote operations devices and managing interrelation of remote operations devices. For example, the techniques described herein include disseminating multiple requests from multiple autonomous vehicles between multiple remote operators, and processes for determining the remote operations device to which to disseminate a particular request. In some examples, multiple remote operations devices may coordinate providing guidance in a single situation and/or to a single autonomous vehicle. In some examples, a single remote operator may coordinate providing guidance to one or more autonomous vehicles.

The techniques and systems described herein may be implemented in a number of ways. Example implementations are provided below with reference to the figures. The implementations, examples, and illustrations described herein may be combined.

Figure 1:
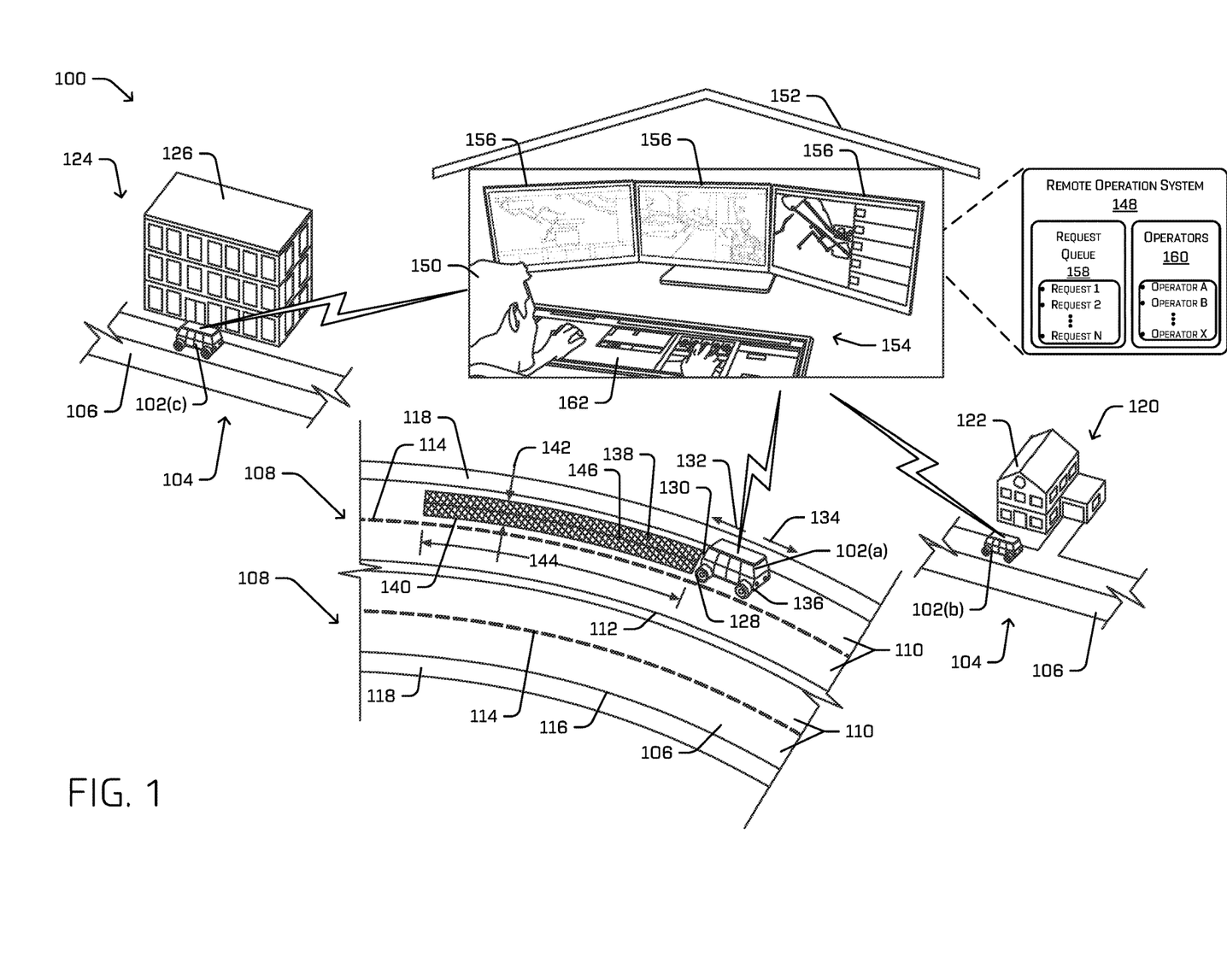
FIG. 1 is a schematic diagram of an example environment through which an example vehicle travels along a road of a road network, according to at least some examples.

FIG. 1 is a schematic diagram of an environment 100 through which a vehicle 102(a)-102(c), collectively vehicle 102, travels. In some examples, the vehicle 102 is an example of an autonomous vehicle, as discussed above. In some examples, the vehicle 102 may include one or more autonomous vehicles as part of a fleet of autonomous vehicles. The environment 100 includes a road network 104 including a plurality of roads 106 having two pairs 108 of lanes 110 separated by a median or double-yellow line 112, with each of the lanes 110 of a pair 108 of lanes 110 defined by a dashed line 114 and lane lines 116. The road 106 also includes shoulders 118 located on opposite sides of the road 106. FIG. 1 also shows a geographic location 120 associated with departure location including a structure 122, such as a house or building, and a destination 124 also including a structure 126, such as a house or building. The road network 104 provides a number of roads 106 defining a route between the geographic location 120 and the destination 124, and FIG. 1 shows an enlarged view of a portion of a road 106. The road network 104 may include a number of features, such as curves, intersections with cross-roads, crosswalks, traffic signs, traffic lights, railroad crossings, traffic circles, directional arrows, etc.

As shown in FIG. 1, the vehicle 102 may travel through the environment 100 via the road network 104 according to a route from the geographic location 120 to the destination 124. For the purpose of illustration, the vehicle 102 may be an autonomous vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some examples, since the vehicle 102 may be configured to control all functions from start to route completion, including all parking functions, it may not include a driver and/or implements for controlling the vehicle such as a steering wheel, etc. . . . In some examples, the techniques described herein may be incorporated into any ground-borne, airborne, or waterborne vehicle (or autonomous vehicle), including those ranging from vehicles that need to be manually controlled by a driver at all times, to those that are partially or fully autonomously controlled.

For illustration, the vehicle 102 shown in FIG. 1 is an automobile having four wheels 128 and respective tires for each of the wheels 128. Other types and configurations of vehicles are contemplated, such as, for example, vans, sport utility vehicles, cross-over vehicles, trucks, buses, agricultural vehicles, two-wheeled vehicles, and/or construction vehicles. The vehicle 102 may be powered by one or more internal combustion engines, one or more electric motors, hydrogen power, any combination thereof, and/or any other suitable power sources. In addition, although the example vehicle 102 has four wheels 128, the techniques described herein may be incorporated into vehicles having fewer or a greater number of wheels, tires, and/or tracks.

In some examples, the example vehicle 102 has four-wheel steering and may operate generally with equal performance characteristics in all directions, for example, such that a first end 130 of the vehicle 102 is a front end of the vehicle 102 when travelling in a first direction 132, and such that the first end 130 becomes a rear end of the vehicle 102 when traveling in the opposite, second direction 134, as shown in FIG. 1. Similarly, a second end 136 of the vehicle 102 is the front end of the vehicle 102 when travelling in the second direction 134, and such that the second end 136 becomes the rear end of the vehicle 102 when traveling in the opposite, first direction 132. These example characteristics may facilitate greater maneuverability, for example, in small spaces or crowded environments, such as parking lots and urban areas.

In the example shown in FIG. 1, the vehicle 102 may include one or more sensors and a vehicle controller to autonomously operate through the environment 100 along the route via the roads 106 of the road network 104, as explained in more detail herein. For example, the vehicle controller may be configured to determine operation state data from the sensor data and/or from data received via a network connection. In some examples, the operation state data may include a vehicle corridor 138 defined by virtual boundaries 140 within which the vehicle 102 may travel.

For example, the vehicle corridor 138 may have a variable corridor width 142 in the width direction of the vehicle 102, and a variable corridor length 144 extending in the direction of travel of the vehicle 102. In some examples, the virtual boundaries 140 of the vehicle corridor 138 may be determined based at least in part on sensor data received from sensors associated with the vehicle 102 and/or road network data received by the vehicle 102 via a road network data store, as explained in more detail herein. In some examples, the vehicle 102 may travel along a drive line 146 within the vehicle corridor 138.

In some examples, the vehicle 102 may operate autonomously until the vehicle 102 encounters an event (e.g., a set of conditions internal or external to the vehicle including environment and operating conditions of the vehicle 102) along the road 106 for which it may request assistance from, for example, a remote operation system 148 located remotely from the vehicle 102. For example, the vehicle 102 may encounter a construction zone associated with a portion of the route, and traffic in the vicinity of the construction zone may be under the direction of a construction worker who provides instructions for traffic to maneuver around the construction zone. Due in part to the unpredictable nature of this type of event, the vehicle 102 may request remote assistance from the remote operation system 148. In some examples, the vehicle 102 may be a part of a fleet of vehicles in communication via a communications network with the remote operation system 148, as explained in more detail herein.

The remote operation system 148 includes a request queue 158 and operators 160. The request queue 158 includes a series of requests for remote operations from vehicles in a fleet of autonomous vehicles. The requests are organized and ordered in the request queue based on priority for each of the requests. The request queue 158 is used by the remote operation system 148 to organize the requests and assign to operators 160 based on the order within the request queue 158. The request queue 158 may be ordered based on priority for each of the requests, the priority based on one or more factors described herein. In some examples, the priority may be based on a time of the request, e.g., with older requests prioritized ahead of newer requests, may be based on other factors such as a passenger status, when the autonomous vehicle is occupied or empty of passengers, among other factors.

In some examples, for example as shown in FIG. 1, the remote operation system 148 may include one or more remote operators 150, which may be human remote operators, located at a remote operations center 152. In some examples, one or more of the remote operators 150 may not be human, such as, for example, they may be computer systems leveraging artificial intelligence, machine learning, and/or other decision-making strategies. In the example shown, the remote operator 150 may interact with one or more vehicles 102 in the fleet of vehicles via a user interface that can include a remote operator interface 154. The remote operator interface 154 may include one or more displays 156 configured to provide the remote operator 150 with data related to operation of the vehicle 102, a subset of the fleet of vehicles, and/or the fleet of vehicles. For example, the displays 156 may be configured to show data related to sensor signals received from the vehicles 102, data related to the road network 104, and/or additional data or information to facilitate providing assistance to the vehicles 102.

Additionally, or alternatively, the remote operator interface 154 may also include a remote operator input device 162 configured to allow the remote operator 150 to provide information to one or more of the vehicles 102, for example, in the form of remote operation signals providing guidance to the vehicles 102. The remote operator input device 162 may include one or more of a touch-sensitive screen, a stylus, a mouse, a dial, a keypad, a microphone, a touchscreen, and/or a gesture-input system configured to translate gestures performed by the remote operator 150 into input commands for the remote operator interface 154. As explained in more detail herein, the remote operation system 148 may provide one or more of the vehicles 102 with guidance to avoid, maneuver around, or pass through events. Additionally, or alternatively, the remote operator interface 154 can include other input/output device(s) such as, for example, a microphone, a speaker, and/or a haptic feedback device (e.g., to "nudge" the remote operator 150 to pay attention to a particular region of the remote operator interface 154).

In some examples, the vehicles 102(a), 102(b), and 102(c) may encounter different events that result in a request for remote operator input at or around the same time. In such examples, the vehicles 102(a), 102(b), 102(c) may convey a remote operations request to the remote operation system 148. The remote operations requests may be prioritized within a queue for processing by one or more remote operators 150. In an illustrative example, the remote operation system 148 may include fewer remote operators than vehicles 102 in the fleet such that the number of requests received by the remote operations system may exceed the available remote operators. In such examples, the requests may be prioritized based on environments, for example with vehicle 102(a) traveling at a higher speed on a highway than vehicle 102(b) in a residential neighborhood. In some examples, the requests may be prioritized based on other factors described herein. The requests may then be assigned to and conveyed to remote operators 150 for processing based on the order of the queue. The remote operators 150 may be filtered based on experience levels, specialized training (e.g., emergency technician, medical training, nursing training, etc.), experience with particular environments, situations, vehicle systems, network connection speed or latency of a particular remote operator; or other such experience or factors. In some examples, the different experience and characteristics may be weighted differently and may be based on a subset of the characteristics. In some examples, the different experience and characteristics may be conditioned on existing conditions. In an illustrative example, particular experience of an operator with a vehicle type may be considered if the remote operator request has to do with a vehicle specific condition or fault. In some examples, the experience level may be considered if the remote operator request is particularly complex or involves many different factors.

The remote operations requests received by the remote operation system 148 are ordered within the queue and subsequently matched to remote operators for processing. After a request is conveyed to a remote operator 150, the sensor data from the vehicle 102 is displayed on the display 156. In some examples, the request may be conveyed to the remote operator 150 and await a response, such as to accept the remote operations request, from the remote operator 150. In the event a remote operator 150 does not accept the request, or fails to respond to the request within a predetermined period of time, the request may be returned to the queue and be prioritized for processing based on the elapsed time since the original request, among other factors.

Figure 2:
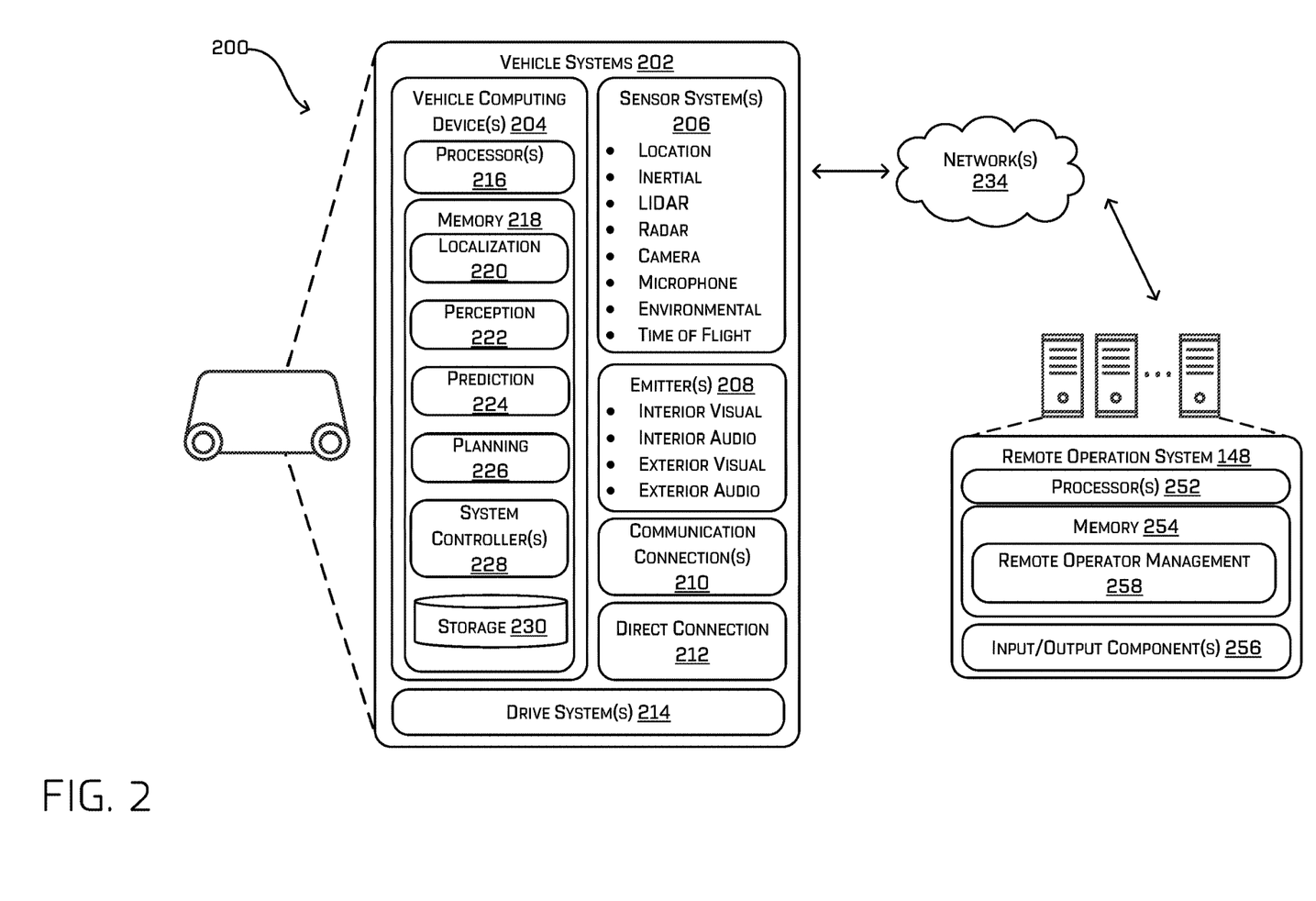
FIG. 2 is a block diagram including an example vehicle system architecture and remote operation system, according to at least some examples.

FIG. 2 is a block diagram of an architecture 200 including a vehicle system 202 for controlling operation of the systems that provide data associated with operation of the vehicle 102, and that control operation of the vehicle 102 in connection with the remote operation system 148. The vehicle system 202 can include one or more vehicle computing devices 204, one or more sensor systems 206, one or more emitters 208, one or more communication connections 210, at least one direct connection 212, and one or more drive systems 214. As described above, the vehicle system 202 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle system 202 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle system 202 is an autonomous vehicle; however, the vehicle system 202 could be any other type of vehicle. While only a single vehicle system 202 is illustrated in FIG. 2, in a practical application, the example system can include a plurality of vehicles, which, in some examples, can comprise a fleet of vehicles.

The vehicle computing device(s) 204, can include processor(s) 216 and memory 218 communicatively coupled with the processor(s) 216. In the illustrated example, the memory 218 of the vehicle computing device(s) 204 stores a localization system 220, a perception system 222, a prediction system 224, a planning system 226, and one or more system controllers 228. Additionally, the memory 218 can include a storage 230, which can store map(s), model(s), etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments.

In at least one example, the localization system 220 can determine a pose (position and orientation) of the vehicle system 202 in relation to a local and/or global map based at least in part on sensor data received from the sensor system(s) 206 and/or map data associated with a map (e.g., of the map(s)). In at least one example, the localization system 220 can include, or be associated with a calibration system that is capable of performing operations for calibrating (determining various intrinsic and extrinsic parameters associated with any one or more of the sensor system(s) 206), localizing, and mapping substantially simultaneously. Additional details associated with such a system are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein.

In at least one example, the perception system 222 can perform object detection, segmentation, and/or classification based at least in part on sensor data received from the sensor system(s) 206. In at least one example, the perception system 222 can receive raw sensor data (e.g., from the sensor system(s) 206). In at least one example, the perception system 222 can receive image data and can utilize one or more image processing algorithms to perform object detection, segmentation, and/or classification with respect to object(s) identified in the image data. In some examples, the perception system 222 can associate a bounding box (or otherwise an instance segmentation) with an identified object and can associate a confidence score associated with a classification of the identified object with the identified object. In some examples, objects, when rendered via a display, can be colored based on their perceived class. The perception system 222 can perform similar processes for one or more other modalities.

The prediction system 224 can receive sensor data from the sensor system(s) 206, map data associated with a map (e.g., of the map(s) which can be in storage 230), and/or perception data output from the perception system 222 (e.g., processed sensor data), and can output predictions associated with one or more objects within the environment of the vehicle system 202. In at least one example, the planning system 226 can determine routes and/or trajectories to use to control the vehicle system 202 based at least in part on sensor data received from the sensor system(s) 206 and/or any determinations made by the perception system 222 and/or prediction system 224.

In some examples, the planning system 226 can amalgamate operation state data from the data it obtains and/or from the correlated data it determines. For example, the operation state data may include:
  a representation of sensor data;
  detected object/event data that includes:
    a location of a detected object,
    a track of the detected object (e.g., a position, velocity, acceleration, and/or heading of the object),
    a classification (e.g., a label) of the detected object (for example, including sub-classes and subsets of classifications as discussed above),
    an identifier of a detected event,
    a confidence level (e.g., a percentage, an indicator that a classification and/or an identifier of a detected event is associated with an indicator of high unpredictability or low confidence),
    a rate of change of confidence levels over time, and/or
    a priority associated with the object(s) and/or event;
  path planning data that includes:
    a route,
    a progress of the vehicle along the route,
    a mission type (e.g., stop for additional passengers, pick up and deliver one passenger),
    passenger input,
    a trajectory,
    a pose of the vehicle,
    a geographic location of the autonomous vehicle, and/or
    and/or a trajectory determined by the vehicle;
  vehicle state information that includes:
    a number of passengers occupying the vehicle,
    passenger input (e.g., speech, passenger state),
    an indication of vehicle and/or sensor health,
    an indication of vehicle history (e.g., past routes, past requests for assistance, past maintenance),
    a charge level of a battery of the vehicle,
    a distance of the vehicle from a fleet base of operations or charging station,
    an indication of whether a communication session is open between the vehicle and a remote operator device(s) and/or another vehicle,
    vehicle control data,
    a vehicle type (e.g., make, model, size, etc.),
    road network data (e.g., data related to a global or local map of an area associated with operation of the vehicle such as, for example, a location of the vehicle within a local map and/or an indication of whether vehicle data is normative for the location (e.g., whether a vehicle speed is above or below a speed limit indicated by the road network data, whether the vehicle is stopped at a position that is identified as being a stop location, whether the vehicle is within a predefined distance of a fleet-wide event)),
    communication channel information (e.g., bandwidth and/or quality of connection, identification of device(s) to which the vehicle is connected, predicted communication channel degradation), and/or
    previous remote operator guidance to the vehicle (e.g., direct instruction, collaboration, and/or confirmation);
  environmental data (e.g., in some examples this may be included in the representation of the sensor data or it may be acquired via the network interface) that includes:
    traffic information,
    weather information,
    city/regional events (e.g., acquired from social media, publications),
    time of day, and/or
    road network data (e.g., a processor-executable map accessible to the vehicle that identifies geographical locations as being a normal driving area, a drivable area, speed limits associated with geographical regions, event locations (e.g., accident location, location from which multiple requests have been sent), and/or an undrivable area and/or containing operating policies for a vehicle to operate therein).

In some examples, the planning system 226 may use at least a portion of the sensor data and/or the operation state data to determine a next action of the vehicle system 202 such as, for example, a trajectory and/or whether to send a request for assistance. In some examples, as described below with respect to FIG. 3, the data described above may be accessible to the remote operator 150 through a communication link with the vehicle fleet 302.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle system 202 is not an autonomous vehicle), one or more of the aforementioned systems can be omitted from the vehicle system 202. While the systems described above are illustrated as "onboard" the vehicle system 202, in other implementations, the systems can be remotely located and/or accessible to the vehicle system 202. Furthermore, while the systems are described above as "systems," such systems can comprise one or more components for performing operations attributed to each of the systems.

In at least one example, the localization system 220, the perception system 222, the prediction system 224, and/or the planning system 226 can process sensor data, as described above, and can send their respective outputs over network(s) 234, to computing device(s) 236. In at least one example, the localization system 220, the perception system 222, the prediction system 224, and/or the planning system 226 can send their respective outputs to the computing device(s) 236 at a particular frequency, after a lapse of a predetermined period of time, in near real-time, etc.

In at least one example, the vehicle computing device(s) 204 can include one or more system controllers 228, which can be configured to control steering, propulsion, braking, safety, emitters, communication, and other systems of the vehicle system 202. These system controller(s) 228 can communicate with and/or control corresponding systems of the drive system(s) 214 and/or other systems of the vehicle system 202.

In at least one example, the sensor system(s) 206 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 206 can include multiple instances of each of these or other types of sensors. The sensor system(s) 206 can provide input to the vehicle computing device(s) 204. In some examples, the sensor system(s) 206 can preprocess at least some of the sensor data prior to sending the sensor data to the vehicle computing device(s) 204. In at least one example, the sensor system(s) 206 can send sensor data, via the network(s) 234, to the computing device(s) 236 at a particular frequency, after a lapse of a predetermined period of time, in near real-time, etc.

The vehicle system 202 can also include one or more emitters 208 for emitting light and/or sound, as described above. The emitter(s) 208 in this example include interior audio and visual emitters to communicate with passengers of the vehicle system 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 208 can be positioned at various locations about the exterior and/or interior of the vehicle system 202.

The vehicle system 202 can also include communication connection(s) 210 that enable communication between the vehicle system 202 and other local or remote computing device(s). For instance, the communication connection(s) 210 can facilitate communication with other local computing device(s) on the vehicle system 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle system 202 to communicate with a remote operation system 148 or other remote services.

The communications connection(s) 210 can include physical and/or logical interfaces for connecting the vehicle computing device(s) 204 to another computing device or a network, such as network(s) 234. For example, the communications connection(s) 210 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 212 can directly connect the drive system(s) 214 and other systems of the vehicle system 202.

In at least one example, the vehicle system 202 can include drive system(s) 214. In some examples, the vehicle system 202 can have a single drive system 214. In at least one example, if the vehicle system 202 has multiple drive systems 214, individual drive systems 214 can be positioned on opposite ends of the vehicle system 202 (e.g., the front and the rear, etc.). In at least one example, the drive system(s) 214 can include sensor system(s) to detect conditions of the drive system(s) 214 and/or the surroundings of the vehicle system 202. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 214. In some cases, the sensor system(s) on the drive system(s) 214 can overlap or supplement corresponding systems of the vehicle system 202 (e.g., sensor system(s) 206).

The drive system(s) 214 can include many of the vehicle systems, including a high voltage battery, a motor to propel the vehicle system 202, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 214. Furthermore, the drive system(s) 214 also include communication connection(s) that enable communication by the respective drive module with other local or remote computing device(s).

In FIG. 2, the vehicle computing device(s) 204, sensor system(s) 206, emitter(s) 208, and the communication connection(s) 210 are shown onboard the vehicle system 202. However, in some examples, the vehicle computing device(s) 204, sensor system(s) 206, emitter(s) 208, and the communication connection(s) 210 can be implemented outside of an actual vehicle (i.e., not onboard the vehicle system 202).

In some examples, a remote operator elevation requirement can be associated with the event and/or combination. For example, a remote operator elevation requirement can specify a "high elevation" that indicates that only remote operations devices having elevated remote operator credentials associated therewith are permitted to handle the request (e.g., the elevated remote operator credentials could indicate a senior remote operator or a more advance or specially trained artificial intelligence). In some examples, a remote operator elevation requirement can specify that a remote operator response to the request for assistance must be confirmed by one or more additional remote operation device and/or that the request is to be disseminated to more than one remote operations device (e.g., because of a highly complex event or the involvement of multiple vehicles requiring guidance in concert or specific safety events). For example, when multiple vehicle systems 202 are in a congested area near a traffic accident or hazardous environment (e.g., a large accident, presence of pedestrians in traffic, a large-scale event such as a fire or other road disruption) and must route through a potentially hazardous environment, due to the traffic accident or avoid numerous potentially hazardous obstacles, multiple remote operators may be requested to ensure safe navigation of the environment.

As shown in FIG. 2, the vehicle system 202 also includes network(s) 234 configured to establish a communication link between the vehicle system 202 and one or more other devices. For example, the network 234 may be configured to allow data to be exchanged between the vehicle system 202, other devices coupled to a network, such as other computer systems, other vehicles systems 202 in the fleet of vehicles, and/or with the remote operation system 148. For example, the network 234 may enable wireless communication between numerous vehicles and/or the remote operation system 148. In various implementations, the network 234 may support communication via wireless general data networks, such as a Wi-Fi network. For example, the network 234 may support communication via telecommunications networks, such as, for example, cellular communication networks, satellite networks, and the like.

In some examples, the network 234 may communicate with a proxy of the remote operation system 148, the proxy configured to receive remote operations requests from a fleet of vehicle systems 202. The fleet of vehicles may convey, at or around the same time, one or more requests to the remote operation system 148 that are all received by the proxy. The proxy may then communicate the requests to a queuing server. The queuing server may receive the requests, prioritize the requests within a queue, and communicate with one or more remote operators to convey the requests for processing. In some examples, the proxy and queuing server may server a local remote operations center servicing a local geographic area. In some examples, remote operations requests may be offloaded from a first remote operations center to a second remote operations center in response to the first center being overloaded with requests and the second center having availability for processing requests.

The example system 200 can additionally include computing device(s) at the remote operation system 148. The remote operation system 148 can include processor(s) 252, memory 254, and input/output component(s) 256. The memory 254 can include a remote operator management system 258. The remote operator management system may include the request queue 158 and other components of the remote operation system 148 as described herein.

The processor(s) 216 of the vehicle system 202 and the processor(s) 252 of the remote operation system 148 can be any suitable processor capable of executing instructions to process data and perform operations as described herein. By way of example and not limitation, the processor(s) 216 and 252 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 and 254 are examples of non-transitory computer-readable media. Memory 218 and 254 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In various implementations, the parameter values and other data illustrated herein may be included in one or more data stores and may be combined with other information not described or may be partitioned differently into more, fewer, or different data structures. In some implementations, data stores may be physically located in one memory or may be distributed among two or more memories.

Those skilled in the art will appreciate that the architecture 200 is merely illustrative and is not intended to limit the scope of the present disclosure. In particular, the computing system and devices may include any combination of hardware or software that may perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle system 202 is discussed below.

Figure 3:
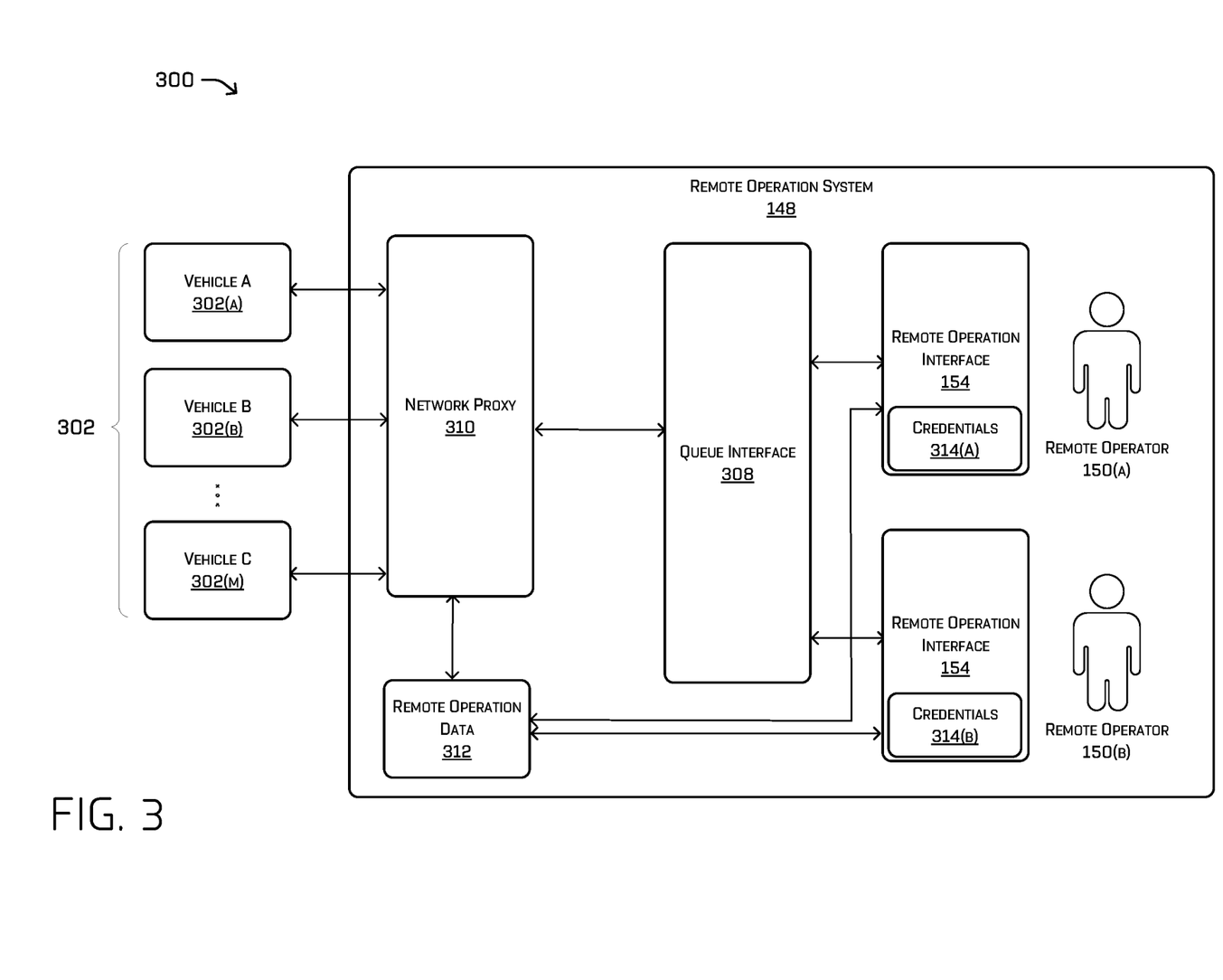
FIG. 3 is a block diagram of an example remote operation system architecture, according to at least some examples.

FIG. 3 shows an example architecture 300 including a vehicle fleet 302, including vehicle 302(*a*), vehicle 302(*b*), . . . vehicle 302(*m*) (where m is any integer greater than or equal to two), and a remote operation system 148. The vehicle fleet 302 may include one or more vehicles 302(*a*), 302(*b*), . . . 302(*m*) described above, at least some which are communicatively coupled to the remote operation system 148 via the network interfaces 236 of the respective vehicles. A network/proxy of the remote operation system 148 may be communicatively coupled to the network interfaces 236 of the vehicles. For example, a vehicle 302(*a*) may send communication signals via the network interface 236, which are received by the network proxy 310. In some examples, the communication signals may include, for example, a request for assistance, sensor data from sensor signals generated by one or more sensors associated with the vehicle 302(*a*), and/or operation state data, though any data and/or output from one or more modules of the vehicle systems 202 is contemplated. In some examples, the sensor data may include raw sensor data and/or processed sensor data, such as a subset of operation state data such as a representation of the sensor data (e.g. a bounding box), as discussed above. In some examples, the communication signals may include a subset of the operation state data discussed above. In some examples, the communication signals from the vehicle fleet 302 may include a request for assistance to the remote operation system 148.

As shown in FIG. 3, a queue interface 308 may receive the remote operations requests from the network proxy 310. The queue interface 308 prioritizes the requests received from the vehicle fleet 302 for processing by one or more remote operators 150(*a*) and 150(*b*) via remote operator interfaces 154. In some examples, the queue interface 308 may directly communicate with the vehicle fleet 302. While only two remote operators are shown in this example, in practice, any number of remote operators may be associated with the remote operation system 148 to respond to requests for remote operations assistance. Additionally, in some examples, the remote operators associated with the remote operation system 148 may be co-located in a same remote operations center, may be located in multiple disparately located remote operations centers, and/or may be individually located (e.g., working from home).

In some examples, the queue interface 308 can be implemented on a device that is separate from a device that includes the remote operator interface 154. For example, the queue interface 308 can include a gateway device and an application programming interface ("API") or similar interface. In some examples, the queue interface 308 is configured to receive the remote operations requests and generate a queue for the remote operations requests for processing by remote operators. The queue interface 308 may score each of the requests in order to prioritize the requests accordingly. The score may be reflective of the priority of each request. The priority may be increased based on safety determinations, for example prioritizing requests that may have a higher risk score associated therewith as computed on the vehicle. Additional priority may be applied based on occupancy status, for example to prioritize vehicle requests associated with vehicles of the vehicle fleet 302 carrying passengers versus requests from vehicles that are unoccupied or carrying cargo only. In an example, the queue interface may initially prioritize requests based on a first come, first served basis, with requests having earlier timestamps prioritized above more recent requests. The queue interface may also apply filters to adjust priority, for example based on safety determinations (e.g., speed of the vehicle or environmental conditions), passenger status (e.g., occupied versus unoccupied), and other such filters.

In some examples, the queue interface 308 may maintain multiple different or separate queues that may operate in parallel to one another. In such examples, the separate parallel queues may correspond to different geographic locations (of the vehicles), different vehicle types, different request types (e.g., requesting guidance assistance versus a request from a passenger of the vehicle system), and other queues related to different filters for the queues may also be applied. The multiple parallel queues may each be accessible by distinct subsets of remote operators, for example with a queue for a first vehicle type only accessible to remote operators qualified to provide guidance or assistance to that class of vehicle. In some examples, the remote operators may be available to handle requests from one or more of the parallel queues.

In some examples, the queue interface 308 may generate multiple different queues or different scoring for the multiple requests, for example with different requests filtered based on vehicle types associated with the requests, occupancy status, scoring based on different environments (e.g., a queue for highway operations versus city operations), or based on location of a vehicle relative to a remote operation system 148. In some examples, requests conveyed to a remote operator 150 and subsequently returned to the queue, for example if the remote operator 150 does not respond to the request or is unable to resolve the request, may be prioritized ahead of other requests.

The queue interface 308 communicates with one or more remote operator interfaces 154 of the remote operation system 148. The queue interface 308 generates the queue of requests and communicates the requests according to a priority of the requests within the queue. In some examples, the queue interface 308 may convey requests out of the order of the queue, for example if remote operators currently available are not qualified or certified to handle the first prioritized requests in the queue.

In some examples, the network proxy 310 may be communicatively coupled to the remote operator interface 154 via the queue interface 308, and in some examples, the remote operator 150 may be able to access the sensor data, the operation state data, and/or any other data in the communication signals received from a vehicle 302(a), 302(b), 302(m) via the remote operator interface 154. In some examples, the remote operator 150 may be able to selectively access the sensor data, operation state data, and/or other data via the remote operator input device 162, and view the selected data via one or more of the displays 156 (see FIG. 1). In some examples, such selective accessing can include transmitting a request for data from a vehicle via the network proxy 310. In some examples, the queue interface 308 may present a subset and/or representation of the data to the remote operator 150 via the remote operator interface 154. As a non-limiting example, the queue interface 308 may create simplistic pictorial representations, bounding boxes, arrows indicating a bearing and velocity of objects, icons representing objects, colorization of the sensor data, or other representations of the data which may simplify interpretation by a remote operator 150. In some examples, the queue interface 308 may also present a simplified or limited amount of the sensor data with an initial request to a remote operator 150, that the remote operator 150 may view to evaluate whether they are willing to accept the request to provide input to the system.

In the example shown, the remote operation system 148 also includes a remote operations network 310 configured to provide communication between two or more of the remote operator interfaces 154 and the respective remote operators 150, and/or communication with remote operation data 312. For example, the remote operation system 148 may include a plurality of remote operator interfaces 154 and respective remote operators 150, and the remote operators 150 may communicate with one another via the remote operations network 310 to facilitate and/or coordinate the guidance provided to the vehicles of the vehicle fleet 302. In some examples, remote operators 150 may not be assigned to specific vehicles of the vehicle fleet 302, but may instead provide guidance to vehicles that have encountered certain types of events and/or to vehicles based on, for example, a level of urgency associated with the vehicle's encounter with the event. In some examples, data associated with an event and/or the guidance provided by a remote operator 150 may be stored by the remote operation system 148, for example, in storage for the remote operation data 312, and/or accessed by other remote operators 150.

In some examples, the remote operation data 312 may be accessible by the remote operators 150, for example, via the remote operator interface 154, for use in providing guidance to the vehicles. The remote operation data 312 may include sensor data and other operating data from the vehicle fleet 302 and may be accessed by the remote operators 150 at the remote operation interface 154 without passing the remote operation data 312 through the queue interface. In this manner, the queue interface may receive basic information related to the identity of the vehicle 302 making the request and the situation encountered. Upon selection of a remote operator 150, the remote operator 150 establishes a direct communication channel with the vehicle 302 that bypasses the queue interface 308. The bypass enables faster communication with lower latency due to high traffic on the queue interface. In some examples, the remote operation data 312 may include global and/or local map data related to the road network 104, events associated with the road network 104, and/or travel conditions associated with the road network 104 due to, for example, traffic volume, weather conditions, construction zones, and/or special events. In some examples, the remote operation data 312 may include data associated with one more of the vehicles of the vehicle fleet 302, such as, for example, maintenance and service information, and/or operational history including, for example, event history associated with the vehicle, route histories, occupancy histories, and other types of data associated with the vehicle.

In some examples, a remote operator 150(a) and a remote operator 150(b) can be associated with credentials 314(a) and credentials 314(b) respectively, which may be used to access a remote operations interface 154 of the remote operation system 148. For example, to activate a session at the remote operator interface 154, the remote operation system 148 may require the remote operator 150(a) to authenticate using the credentials 314(a). In some examples, the credentials may be specific to the remote operator interface 154. In some examples, requests for assistance with a particular permutation of operation state data (e.g., certain events) and/or a particular remote operation option may require resolution by a remote operator interface 154 having elevated credentials (e.g., credentials with greater and/or different permissions). For example, if a remote operator 150(a) selects an action at a remote operator interface 154 that would affect the vehicle fleet 302 instead of just one vehicle, the action could be transmitted to a remote operator 150(b) that has elevated credentials associated therewith for confirmation, modification, and/or rejection. A request and/or operation state data associated with an elevated level of credentials can be used to determine a remote operator interface 154 to which to relay the request. In some examples, the queue interface 308 can relay a request and/or operation state data associated with an elevated level of credentials to multiple remote operator interfaces 154 instead of a remote operator interface 154.

In some examples, the credentials may be associated with situations, environments, vehicle types, and/or qualifications with which the remote operator 150 has experience. The credentials 314 may, for example, describe qualifications for interacting with different vehicle types, levels of seniority or experience, or other such qualifications (e.g., emergency medical experience, technical knowledge, etc.) that may relate to what requests the remote operator is able to resolve. In such examples, the queue interface 308 may filter available remote operators for assigning requests based on the credentials and the availability of the respective remote operator 150(a) and/or remote operator 150(b).

In some examples, more than one remote operator may be required to confirm an event and/or resolution of the event. As a non-limiting example, consider an event in which sensors are somewhat obscured from a vehicle 102 such that a remote operator 150(a) is unable to propose a resolution to the event, such that a corresponding trajectory has a high enough confidence level. In such an example, the remote operation system 148 may require one or more additional remote operators to confirm the event and/or provide the same resolution of the event, regardless of credential level.

In some examples, the remote operator 150(a) may be uncertain of how to resolve the request or may be unresponsive to the request. In such examples, the remote operator 150(a) may return the request to the queue interface 308 by affirmatively rejecting the request or may return the request by not responding to accept a remote operations request within a predetermined period of time. In order to reduce latency in the remote operations system for the vehicle fleet 302, the period of time may be a few seconds, such as five to ten seconds before being returned to the queue interface 308. The queue interface 308 may provide escalation of the returned requests such that they receive a higher priority score than other requests due to the elapsed time as a result of returning to the queue.

Figure 4:
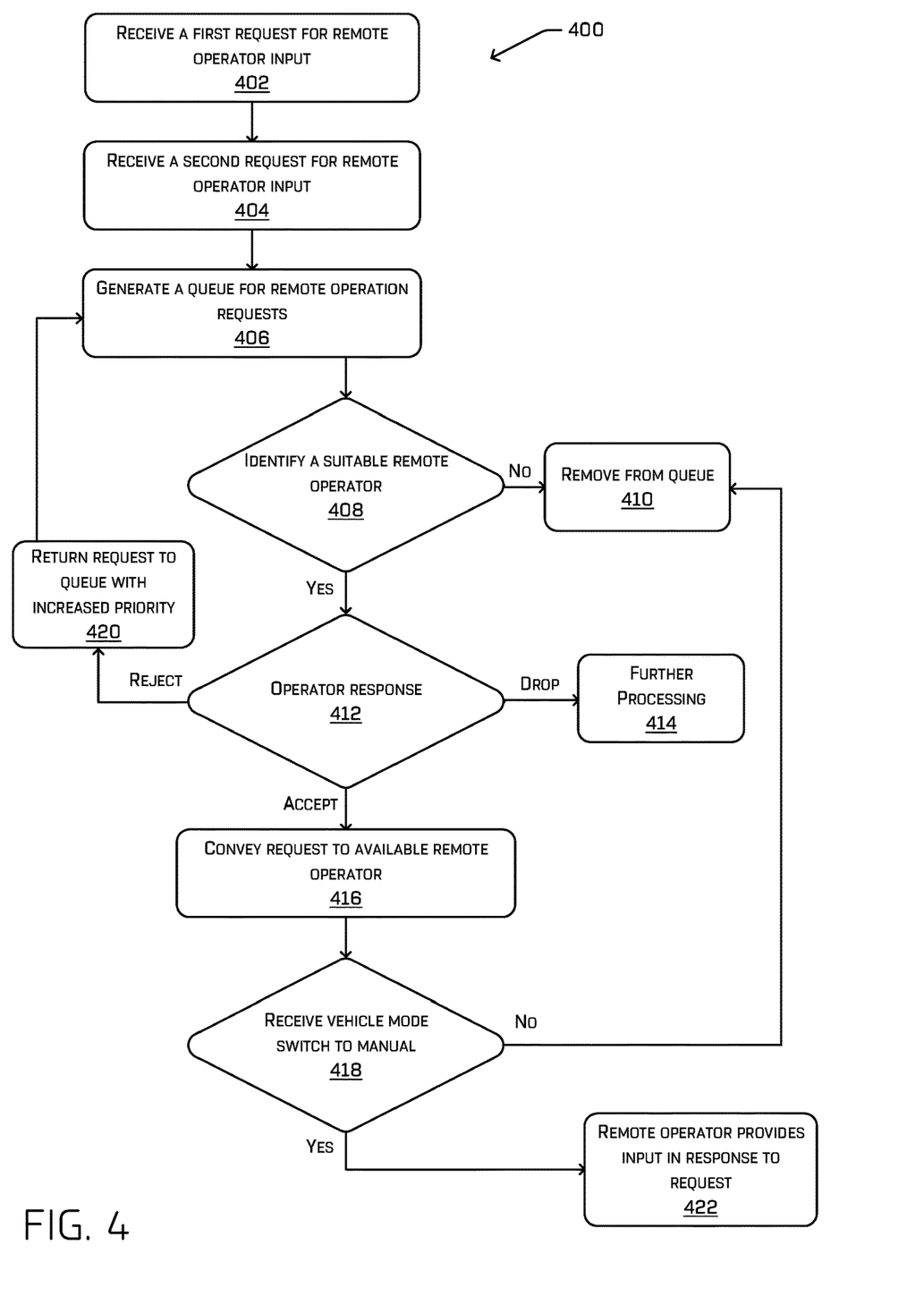
FIG. 4 is a block diagram of an example process for generating a queue for remote operator inputs from a fleet of vehicles, according to at least some examples.

FIG. 4 is a block diagram of a process 400 for generating a queue for remote operator inputs from a fleet of vehicles, according to at least some examples. In some examples, the process 400 can be implemented using components and systems illustrated in FIG. 2 and/or FIG. 3 and described above, such as the remote operation system 148, although the process 400 is not limited to being performed by such components and may be performed, in whole or in part, by a separate system. Moreover, the components and systems of FIGS. 2 and 3 are not limited to performing the process 400.

At operation 402, the process 400 includes receiving a first request for remote operator input. The first request is a first request for remote operator input for a first vehicle of a fleet of vehicles. The first request may include sensor data or information related to the request describing a situation, vehicle type, passenger status, risk score, or other such information from the vehicle.

At operation 404, the process 400 includes receiving a second request for remote operator input. The second request is from a second vehicle of the vehicle fleet and include information similar to the first request. The first request and the second request are received at the remote operation system 148 and may be received by a proxy and/or by a queuing system of the remote operations system, such as queue interface 308.

At operation 406, the process 400 includes generating a queue for remote operation requests. The queue is generated by the queue interface 308 as described herein by prioritizing the first request and the second request relative to one another. The queue is generated based on a priority score or risk score associated with each request. In an example, the risk score may reflect a risk associated with the first request and the second request. The queue may order the first request and the second request to prioritize the requests for processing by remote operators.

At operation 408, the process 400 includes identifying a suitable remote operator. The suitable remote operator may be identified based on filters including experience level, certification, number of requests processed, experience with a situation, and other such filters described herein. In some examples a remote operator closer in physical proximity to the vehicle may be selected to reduce latency. In some examples a remote operator with a faster connection to the network may be selected to reduce latency in the response. determining whether a first remote operator is able to handle a request from the queue. When a local remote operation center is able to process remote operation request, the process 400 may include determining that a first remote operator has availability to handle a request. In some examples, the operation 408 includes identifying one or more remote operators having credentials or experience matching or meeting one or more requirements of the remote operation request. The credentials of the remote operators may be accessed to filter the remote operators to identify remote operators capable of handling the request. In some examples, the filters may include filters for availability, e.g., not presently handling a request or otherwise unavailable, filters for vehicle types, filters for experience level, filters for experience with particular locations or environments, and other such filters. By applying such filters, one or more remote operators may be identified to handle one or more requests from the queue. The filters may include mission status information, for example for demonstration purposes, especially valuable cargo or personnel, weather conditions, and other such filters. In some examples, the filters applied to the queue may be focused on the vehicle and vehicle conditions while other filters for remote operators may also be applied in other examples including tiers of remote operators, experience levels, number of requests processed by remote operators, and other user-defined filters applied by each remote operator. In some examples, user-defined filters may be customizable for input or selection by the remote operators, for example to only view remote operation requests for selection based on their customized preferences.

In some examples, the remote operation system 148 may include multiple remote operation centers, with remote operation centers scattered around a geographic region where a fleet of vehicles operate. The remote operation centers may be selected based on proximity to a vehicle requesting remote operation input. In some examples, the remote operation center in a particular region may be overloaded, while a second remote operation center may have availability. To reduce latency, a nearest remote operation center may be selected to process a request. In some examples, to reduce or prevent delays in processing requests, a distant remote operation center may be relied upon to fulfill requests when a local center is overloaded.

At operation 410, the process 400 includes removing the request from the queue in response to determining that no remote operators have required credentials or filters to handle the request. The request may be removed from the queue to avoid the request remaining on the queue without any remote operators to resolve or provide input.

At operation 412, the process 400 includes receiving an operator response in response to selecting the remote operator at operation 408. The remote operator may accept the request, reject the request, or indicate the request should be dropped from the queue. The remote operator may accept the request and proceed to operation 416 to handle the request. When the remote operator rejects the request, the request is returned to the queue with increased priority at operation 420. In some examples, the request may be considered rejected in an event where the remote operator does not respond within a threshold period of time. The request may be returned to the queue in response to the request timing out or being affirmatively rejected by the remote operator as described above. In some examples the request may receive an elevated priority when returned to the queue such that it is at or near the top of the queue for processing. When the remote operator indicates that the request should be dropped from the queue, for example in response to determining that no remote operator input is needed or that the situation may be resolved already or easily resolved by the vehicle system alone, then the request may be transmitted for further processing at operation 414.

At operation 414, the request indicated by the remote operator for dropping from the queue receives further processing. The further processing may include receiving a confirmation from a second remote operator that the request should be dropped prior to removing from the queue. The further processing may also include processing, at the remote operation system, the sensor data to determine whether remote operator input may be required. The additional resources of the remote operation system may be able to process the sensor data and us additional search, identification, and recognition algorithms in addition to more detailed vehicle models and environment models to determine whether remote input may be needed. Such additional processing may be conveyed to the vehicle to enable the vehicle system to resolve the situation without remote operator input. In some examples, the request may return to the queue if a second remote operator contradicts the first remote operator and indicates that the request is valid. In some examples, the second remote operator may accept the request in place of the first remote operator or may simply remove the drop indication and return the request to the queue as described at operation 420.

At operation 416, the process 400 includes conveying the request to the available remote operator. The available remote operator may be a single remote operator identified at operation 408 or may include multiple remote operators that may receive the request in parallel for redundancy. The request may include establishing a communication link between the remote operator identified and who has accepted the request and the vehicle such that vehicle data may be transmitted through the direct communication link to reduce system latency.

At operation 418, the process 400 includes receiving a vehicle mode switch to manual, indicating a switch to receive remote operation from complete autonomous mode. The switch may be rejected, for example in a case where a remote operator is identified and accepts a request, however the situation no longer exists or the vehicle has already resolved the situation and no longer requests remote operator input. In such examples, the request may be removed from the queue as described at operation 410. In the event that the vehicle accepts the switch to manual or remote operation mode then the process 400 proceeds to operation 422.

At operation 422, the process 400 includes the remote operator providing input in response to the request. When the remote operator accepts a request, they may receive sensor data as described herein and view the event or situation encountered by the vehicle and may provide input accordingly to resolve the situation so the vehicle can proceed.

Figure 5:
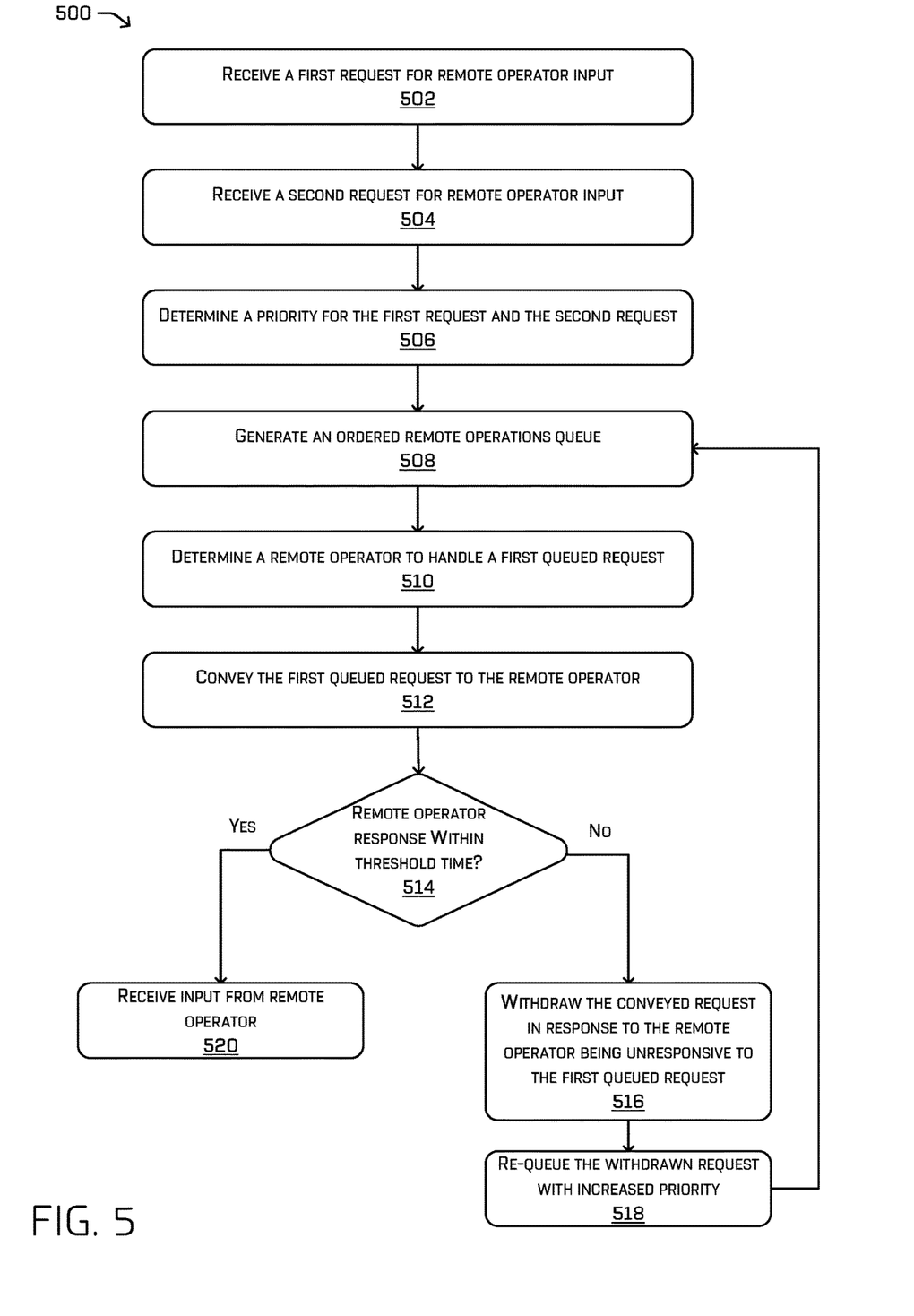
FIG. 5 is a block diagram of an example process for conveying requests for remote operator inputs for a fleet of vehicles, according to at least some examples.

FIG. 5 is a block diagram of a process 500 for conveying requests for remote operator inputs for a fleet of vehicles, according to at least some examples. The process 500 may be performed by a computing system of the remote operation system 148.

At operation 502, the process 500 includes receiving a first request for remote operator input from a first vehicle of a fleet of autonomous vehicles. The first request is a first request for remote operator input for a first vehicle of a fleet of vehicles. The first request may include sensor data or information related to the request describing a situation, vehicle type, passenger status, risk score, or other such information from the vehicle.

At operation 504, the process 500 includes receiving a second request for remote operator input from a second vehicle of the fleet. The second request is from a second vehicle of the vehicle fleet and include information similar to the first request. The first request and the second request are received at the remote operation system 148 and may be received by a proxy and/or by a queuing system of the remote operations system, such as queue interface 308.

At operation 506, the process 500 includes determining a priority for the first request and the second request. The priority for the first request and the second request may be determined based on sensor data, vehicle type, passenger occupancy, and other such information. The priority for each is generated based on a priority score or risk score associated with each request. In an example, the risk score may reflect a risk associated with the first request and the second request.

At operation 508, the process 500 includes generating an ordered remote operations queue. The queue may be ordered based on the priority or risk score, for example with higher priority scores being moved to a front of the queue for processing. In some examples, as described herein, the queue may include multiple different queues based on different vehicle types, such as a first queue for a first class of vehicle and a second queue for a second class of vehicle. In some examples, the class of vehicle may relate to a vehicle type. In some examples, the class of vehicle may relate to occupancy of the vehicle or vehicle use, such as a vehicle used for passenger or item transportation.

At operation 510, the process 500 includes determining a remote operator to handle a first queued request. The remote operator may be determined based on remote operator availability and one or more filters, the one or more filters related to autonomous vehicle type or equipment, environment, location, prior experience of the remote operator in an environment surrounding the autonomous vehicle, or overall experience of the remote operator.

At operation 512, the process 500 includes conveying the first queued request to the remote operator. The request may be conveyed to the remote operator initially as a simple request inquiring whether the remote operator is available and ready to accept the remote operation request for input. The request may include a summary of sensor data, such as a map location and one or more still or moving image frames for viewing the surrounding environment of the vehicle. The remote operator may accept or reject the request as described above.

At operation 514, the process 500 includes determining whether a remote operator response is received within a threshold time. The remote operator may respond to a notification or request to accept the remote operation request and begin resolving the issue that resulted in the remote operations request. A lack of input during the threshold period of time or other unresponsiveness over a period of time may result in the remote operator being considered to not have responded to the request. In the event that the remote operator does not respond within the threshold, the process 500 proceeds to operation 516. In the event the remote operator responds, the process 500 proceeds to operation 520.

At operation 516, the process 500 includes withdrawing the conveyed request in response to the remote operator being unresponsive to the first queued request. As described herein, the request may time out at the remote operator station after a predetermined period of time. In some examples, after a user has accepted the request, if no input is provided to the autonomous vehicle within a period of time then the request may be returned to the queue.

At operation 518, the process 500 includes re-queuing the withdrawn request at the queue. The request may be re-queued with priority indicative of the initial time of the first request or with increased priority. The request time for the request may be used, in some examples, to determine the order of the queue. In such examples, the returned request may be moved to a priority location of the queue based at least in part on the request time, as the request time for a returned request will be previous to other requests in the queue.

At operation 520, the process 500 includes receiving input from the remote operator to provide guidance or input to the autonomous vehicle. As described herein, the input may be provided through a remote operator portal and may include one or more instructions to control or provide additional information for controlling the autonomous vehicle.

EXAMPLE CLAUSES

A. A remote operations system for a fleet of autonomous vehicles, comprising: at least one processor; and at least one memory having stored thereon processor-executable instructions that, when executed, configure the remote operations system to: receive a first request for remote operator assistance from a first autonomous vehicle, the first request associated with a first event encountered by the first autonomous vehicle; receive a second request for remote operator assistance from a second autonomous vehicle, the second request associated with a second event encountered by the second autonomous vehicle; determining a first score associated with the first request; determining a second score associated with the second request; adding, based at least in part on the first score and the second score, the first request and the second request to a queue of remote operator requests; determine a remote operator based at least in part on remote operator data comprising remote operator availability, a remote operator to process a first queued request from the queue; and transmit the first queued request to the remote operator based at least in part on the remote operator data and a queue order.

B. The remote operations system of paragraph A, wherein the first score is based on at least one of: a request time; environment data; mission status data; or a passenger status.

C. The remote operations system of paragraph A, wherein the operations further comprise receiving a credential associated with the remote operator indicating a level of experience of the remote operator, and wherein determining the remote operator is further based on the credential.

D. The remote operations system of paragraph C, wherein the experience level is at least one of experience with a particular situation associated with the first request, experience with a type of situation associated with the first request, or a time duration of experience.

E. A method, comprising: receiving a first request for remote operator assistance; receiving a second request for remote operator assistance; determining a first score associated with the first request; determining a second score associated with the second request; adding, based on the first score and the second score, the first request and the second request to a queue of remote operator requests; determining a remote operator to process a first queued request based at least in part on remote operations data; and transmitting the first queued request to the remote operator.

F. The method as paragraph E recites, further comprising: determining an amount of time that has transpired since transmitting the first queued request to the remote operator; and returning, based at least in part on the amount of time meeting or exceeding a threshold amount of time, the conveyed request to the queue, wherein a position of the returned request in the queue is based at least in part on a third score associated with the first request, the third score greater than the first score.

G. The method as paragraph F recites, further comprising: maintaining the conveyed request at a remote operation device associated with the remote operator device after the conveyed request returns to the queue; and removing the conveyed request from the remote operation device in response to the conveyed request being removed from the queue.

H. The method as paragraph E recites, wherein the remote operations data comprises: a physical location of the remote operator relative to a location of a respective vehicle with which the conveyed request is associated; a current network connection speed to a computing device associated with the remote operator; an availability of the remote operator; an experience of the remote operator with respect to an event type; an experience of the remote operator with a type of vehicle; or a duration of experience of the remote operator.

I. The method as paragraph E recites, wherein the remote operator data comprises: a physical location the remote operator relative to a location of a respective autonomous vehicle with which the conveyed request is associated; and an availability of the remote operator to service the request, wherein determining the remote operator comprises determining a remote operator that is currently available and closest to the respective autonomous vehicle.

J. The method as paragraph E recites, wherein: determining the remote operator comprises determining a plurality of remote operators; conveying the conveyed request is to the plurality of remote operators; and the method further comprises receiving an acceptance of the conveyed request from a first remote operator of the plurality of remote operators.

K. The method as paragraph J recites, wherein the plurality of remote operators is selected based on the plurality of remote operators meeting one or more requirements associated with the conveyed request.

L. The method as paragraph K recites, wherein the one or more requirements comprise at least one of: experience with a vehicle type, an experience level of the remote operator; specialized training; or availability of the plurality of remote operators.

M. The method as paragraph E recites, wherein determining the first score and the second score are based on at least one of: a request time, a speed of the vehicle sending the request, a location of the vehicle sending the request, an emergency status of the vehicle sending the request, a vehicle operating environment, or a passenger status.

N. The method as paragraph E recites, wherein conveying the at least one of the first request or the second request to the remote operator comprises conveying sensor data gathered by a sensor associated with the of the first autonomous vehicle or the second autonomous vehicle.

O. One or more non-transitory computer-readable media storing instructions that, when executed by one or more processors, cause the one or more processors to perform actions comprising: receiving a first request for remote operator assistance; receiving a second request for remote operator assistance; determining a first score associated with the first request; determining a second score associated with the second request; adding, based on the first score and the second score, the first request and the second request to a queue of remote operator requests; determining a remote operator to process a first queued request based at least in part on remote operations data; and transmitting the first queued request to the remote operator.

P. The one or more non-transitory computer-readable media as recited in paragraph O, further comprising: determining that the remote operator has not responded to the conveyed request within a predetermined period of time; returning the conveyed request to the queue; and reprioritizing the conveyed request relative to other requests in the queue.

Q. The one or more non-transitory computer-readable media as recited in paragraph O, further comprising: maintaining the conveyed request at a remote operation device associated with the remote operator device after the conveyed request returns to the queue; and removing the conveyed request from the remote operation device in response to the conveyed request being removed from the queue.

R. The one or more non-transitory computer-readable media as recited in paragraph O, wherein: determining the remote operator comprises determining a plurality of remote operators; conveying the conveyed request is to the plurality of remote operators; and further comprising receiving an acceptance of the conveyed request from a first remote operator of the plurality of remote operators.

S. The one or more non-transitory computer-readable media as recited in paragraph R, wherein the plurality of remote operators is selected based on the plurality of remote operators meeting one or more requirements associated with the conveyed request.

T. The one or more non-transitory computer-readable media as recited in paragraph O, wherein the remote operation data comprises: a physical location the remote operator relative to a location of a respective vehicle with which the conveyed request is associated; a current network connection speed to a computing device associated with the remote operator; an availability of the remote operator; an experience of the remote operator with respect to an event type; an experience of the remote operator with a type of vehicle; or a duration of experience of the remote operator.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

While one or more examples of the invention have been described, various alterations, additions, permutations, and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A remote operations system for a fleet of autonomous vehicles, comprising:
   at least one processor; and
   at least one memory having stored thereon processor-executable instructions that, when executed, configure the remote operations system to:
      receive a first request for remote operator assistance from a first autonomous vehicle, the first request associated with a first event encountered by the first autonomous vehicle;
      receive a second request for remote operator assistance from a second autonomous vehicle, the second request associated with a second event encountered by the second autonomous vehicle;
      determining a first score associated with the first request based at least in part on one or more of a request time, an environment data, a mission status data, or a passenger status;
      determining a second score associated with the second request;
      adding, based at least in part on the first score and the second score, the first request to a queue of remote operator requests and adding the second request to the queue of remote operator requests;
      determine, based at least in part on remote operator data comprising remote operator availability, a remote operator to process a first queued request from the queue;
      transmit the first queued request to the remote operator based at least in part on the remote operator data and a queue order;

determining an amount of time that has transpired since transmitting the first queued request to the remote operator; and returning, based at least in part on the amount of time meeting or exceeding a threshold amount of time, the transmitted request to the queue, wherein a position of the returned request in the queue is based at least in part on a third score associated with the first request, the third score greater than the first score.

2. The remote operations system of claim 1, wherein the operations further comprise receiving a credential associated with the remote operator indicating a level of experience of the remote operator, and wherein determining the remote operator is further based on the credential.

3. The remote operations system of claim 2, wherein the level of experience is at least one of experience with a particular situation associated with the first request, experience with a type of situation associated with the first request, or a time duration of experience.

4. The remote operations system of claim 1, wherein the operations further comprise transmitting the first queued request to the remote operator for the remote operator to provide guidance to the first autonomous vehicle.

5. The remote operations system of claim 1, wherein the operations further comprise:
maintaining the transmitted request at a remote operation device associated with the remote operator after the transmitted request returns to the queue; and
removing the transmitted request from the remote operation device in response to the transmitted request being removed from the queue.

6. A method, comprising:
receiving a first request for remote operator assistance;
receiving a second request for remote operator assistance;
determining a first score associated with the first request;
determining a second score associated with the second request;
adding, based on the first score and the second score, the first request to a queue of remote operator requests and the second request to the queue of remote operator requests;
determining a remote operator to process a first queued request based at least in part on remote operations data;
transmitting the first queued request to the remote operator;
determining an amount of time that has transpired since transmitting the first queued request to the remote operator; and
returning, based at least in part on the amount of time meeting or exceeding a threshold amount of time, the transmitted request to the queue,
wherein a position of the returned request in the queue is based at least in part on a third score associated with the first request, the third score greater than the first score.

7. The method of claim 6, further comprising:
maintaining the transmitted request at a remote operation device associated with the remote operator after the transmitted request returns to the queue; and
removing the transmitted request from the remote operation device in response to the transmitted request being removed from the queue.

8. The method of claim 5, wherein the remote operations data comprises:
a physical location of the remote operator relative to a location of a respective vehicle with which the transmitted request is associated;
a current network connection speed to a computing device associated with the remote operator;
an availability of the remote operator;
an experience of the remote operator with respect to an event type;
an experience of the remote operator with a type of vehicle; or
a duration of experience of the remote operator.

9. The method of claim 6, wherein the remote operations data comprises:
a physical location of the remote operator relative to a location of a respective autonomous vehicle with which the transmitted request is associated; and
an availability of the remote operator to service the request,
wherein determining the remote operator comprises determining a remote operator that is currently available and closest to the respective autonomous vehicle.

10. The method of claim 6, wherein:
determining the remote operator comprises determining a plurality of remote operators;
conveying the transmitted request is to the plurality of remote operators; and
the method further comprises receiving an acceptance of the transmitted request from a first remote operator of the plurality of remote operators.

11. The method of claim 10, wherein the plurality of remote operators is selected based on the plurality of remote operators meeting one or more requirements associated with the transmitted request.

12. The method of claim 11, wherein the one or more requirements comprise at least one of:
experience with a vehicle type,
an experience level of the remote operator;
specialized training; or
availability of the plurality of remote operators.

13. The method of claim 6, wherein determining the first score and the second score are based on at least one of:
a request time,
a speed of a vehicle sending the request,
a location of the vehicle sending the request,
an emergency status of the vehicle sending the request,
a vehicle operating environment, or
a passenger status.

14. The method of claim 6, wherein transmitting the first queued request to the remote operator comprises conveying sensor data gathered by a sensor associated with at least one of a first autonomous vehicle or a second autonomous vehicle.

15. One or more non-transitory computer-readable media storing instructions that, when executed by one or more processors, cause the one or more processors to perform actions comprising:
receiving a first request for remote operator assistance;
receiving a second request for remote operator assistance;
determining a first score associated with the first request;
determining a second score associated with the second request;
adding, based on the first score and the second score, the first request to a queue of remote operator requests and the second request to the queue of remote operator requests;
determining a remote operator to process a first queued request based at least in part on remote operations data;
transmitting the first queued request to the remote operator;

determining an amount of time that has transpired since transmitting the first queued request to the remote operator; and returning, based at least in part on the amount of time meeting or exceeding a threshold amount of time, the transmitted request to the queue, wherein a position of the returned request in the queue is based at least in part on a third score associated with the first request, the third score greater than the first score.

16. The one or more non-transitory computer-readable media of claim 15, further comprising:

determining that the remote operator has not responded to the transmitted request within a predetermined period of time;

returning the transmitted request to the queue; and reprioritizing the transmitted request relative to other requests in the queue.

17. The one or more non-transitory computer-readable media of claim 16, further comprising:

maintaining the transmitted request at a remote operation device associated with the remote operator after the transmitted request returns to the queue; and removing the transmitted request from the remote operation device in response to the transmitted request being removed from the queue.

18. The one or more non-transitory computer-readable media of claim 15, wherein:

determining the remote operator comprises determining a plurality of remote operators;

conveying the transmitted request is to the plurality of remote operators; and further comprising receiving an acceptance of the transmitted request from a first remote operator of the plurality of remote operators.

19. The one or more non-transitory computer-readable media of claim 18, wherein the plurality of remote operators is selected based on the plurality of remote operators meeting one or more requirements associated with the transmitted request.

20. The one or more non-transitory computer-readable media of claim 15, wherein the remote operation data comprises:

a physical location of the remote operator relative to a location of a respective vehicle with which the transmitted request is associated;

a current network connection speed to a computing device associated with the remote operator;

an availability of the remote operator;

an experience of the remote operator with respect to an event type;

an experience of the remote operator with a type of vehicle; or a duration of experience of the remote operator.

* * * * *